S. PEARSON.
CONVERTIBLE BABY CARRIAGE AND SLEIGH.
APPLICATION FILED MAR. 18, 1918.
1,302,426.
Patented Apr. 29, 1919.
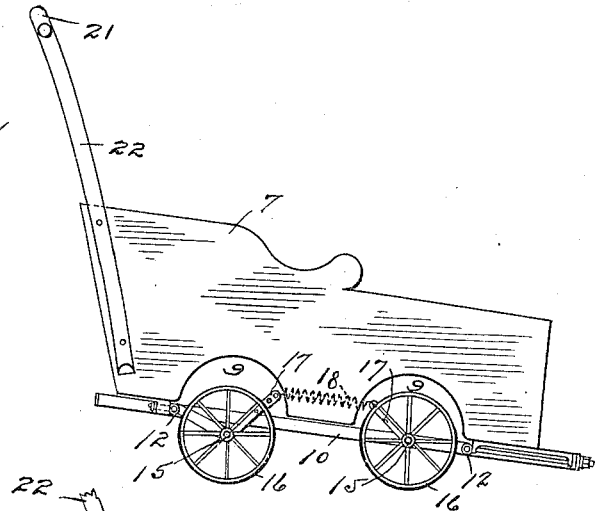
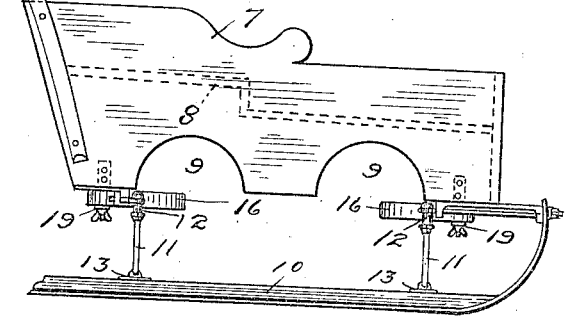
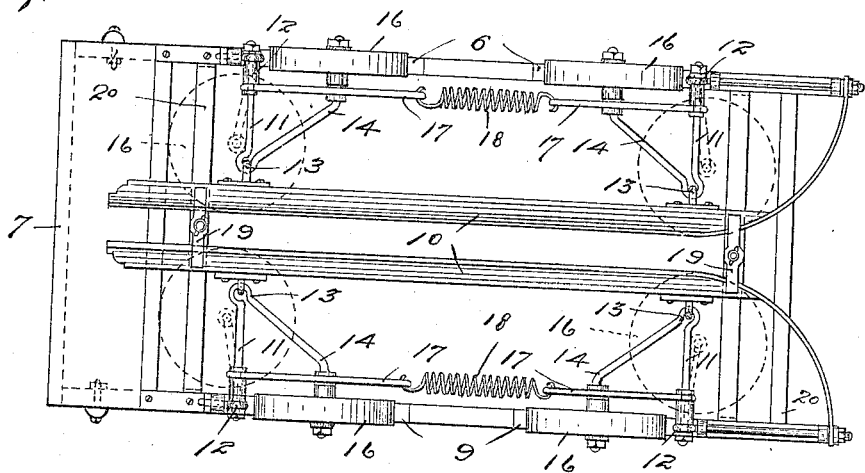
Inventor
Swan Pearson
By his Attorneys
Williamson Merchant

UNITED STATES PATENT OFFICE.

SWAN PEARSON, OF MINNEAPOLIS, MINNESOTA.

CONVERTIBLE BABY-CARRIAGE AND SLEIGH.

1,302,426. Specification of Letters Patent. Patented Apr. 29, 1919.

Application filed March 18, 1918. Serial No. 223,201.

*To all whom it may concern:*

Be it known that I, SWAN PEARSON, a citizen of the United States, residing at Minneapolis, in the county of Hennepin and State of Minnesota, have invented certain new and useful Improvements in Convertible Baby-Carriages and Sleighs; and I do hereby declare the following to be a full, clear, and exact description of the invention, such as will enable others skilled in the art to which it appertains to make and use the same.

My invention has for its object to provide a convertible baby carriage and sleigh; and, to this end, it consists of the novel devices and combinations of devices hereinafter described and defined in the claims.

In the accompanying drawings, which illustrate the invention, like characters indicate like parts throughout the several views.

Referring to the drawings:

Figures 1 and 2 are views in side elevation illustrating the invention converted, respectively, into a baby carriage, and a sleigh; and Fig. 3 is a bottom plan view of the invention, as shown in Fig. 1, on an enlarged scale, with some parts broken away and some parts shown in different positions, by means of broken lines.

The numeral 7 indicates a box-like body, having an inclined back, the bottom of said body being formed to provide a raised seat 8. In the sides of the body 7, below the bottom thereof, are formed front and rear relatively large segmental notches 9, to afford clearance for the wheels of the baby carriage, as will presently appear. A pair of runners 10 is connected to the sides of the body 7, for folding movement thereunder, by front and rear knees 11. The upper ends of the knees 11 are secured, by front and rear bearings 12, to the lower edges of the sides of the body 7, for lateral swinging movement from vertical positions to horizontal positions under the body 7. These bearings 12, and bearings 13, which connect the lower ends of the knees 11 to the runners 10, are so constructed as to permit said knees to turn on their longitudinal axes, in the movement of the runners 10 and wheels to and from operative positions. Extending from the lower ends of the knees 11, are oblique braces 14, the free ends of which are bent into parallel arrangement with the knees 11, to afford trunnions 15, on which are journaled wheels 16, heretofore mentioned. The front ends of the shoes on the runners 10 are curved upwardly and pivoted to the front ends of the front bearings 12.

To give the body 7 the required resilience, when used as a baby carriage, there is secured to the trunnions 15, inward of the wheels 16, bell-crank levers 17. These bell-crank levers 17 extend parallel to the inner facing of the wheels 16, and their outwardly projecting arms are secured to the knees 11 and thereby rigidly connect the braces 14, at their outer ends, to said knees. The other arms of bell-crank levers 17 are connected, in alined pairs, by coil springs 18. Obviously, the knees 11 afford pivoted fulcrums for the bell-crank levers 17, thereby permitting free action of the springs 18 to resiliently support the body 7 from the wheels 16. It will be noted that the inner arms of the bell-crank levers 17 are provided with a plurality of longitudinally spaced bores, into any of which the hooked ends of the springs 18 may be secured to vary the tension of said springs under variable loads.

When the invention is converted into a baby carriage, the knees 11 are adjusted to bring the wheels 16 into operative positions in which they extend into the notches 9. In this position of the wheels 16 the knees 11 and runners 10 are folded into a horizontal plane, under the body 7, and held in this position by turn buttons 19, arranged to be turned into overlapping engagement with the runners 10. These turn-buttons 19 are pivoted to transverse tie-bars 20, secured to the sides of the body 7.

A push bar 21 for the vehicle is attached to the upper ends of a pair of arms 22 rigidly secured to the body 7.

When the contrivance is converted into a sleigh, as shown in Fig. 2, the knees 11 are adjusted to bring the runners 10 into operative positions, and the wheels 16 into inoperative positions, as shown by broken lines in Fig. 3. In this position of the runners 10 the springs 18 are detached, at least, from one bell-crank lever 17 of each pair and the wheels 16 rigidly held by the turn buttons 19, which, in turn, hold the knees 11, and hence the wheels 16, on the trunnions 15, in operative positions.

From the above description it is evident that the contrivance may be very quickly converted into a baby carriage or sleigh.

What I claim is:

1. A convertible baby carriage and sleigh comprising a body, a pair of runners, knees, bearings connecting the knees to the body for swinging movement from vertical positions to horizontal positions and for turning movement on their longitudinal axes, bearings connecting the knees to the runners with freedom for turning movement, and wheels journaled on the knees, said knees being adjustable to alternately carry the runners and wheels from operative positions to inoperative positions.

2. A convertible baby carriage and sleigh, comprising a body, a pair of runners, knees, bearings connecting the knees to the body for swinging movement from vertical positions to horizontal positions, and for turning movement on their longitudinal axes, bearings connecting the knees to the runners, with freedom for turning movement, wheels journaled on the knees, said knees being adjustable to alternately carry the runners and wheels from operative positions to inoperative positions under the body, and clamps for rigidly holding the knees in either of their extreme positions.

3. A baby carriage comprising a body, bell-crank levers arranged in alined pairs, and having one of their arms pivoted to the body, coil springs connecting the other arms of alined pairs of bell-crank levers, and wheels journaled on the bell-crank levers at the elbows thereof.

In testimony whereof I affix my signature in presence of two witnesses.

SWAN PEARSON.

Witnesses:
HULDA LIEDER,
HARRY D. KILGORE.

Copies of this patent may be obtained for five cents each, by addressing the "Commissioner of Patents, Washington, D. C."